(12) United States Patent
Kumar

(10) Patent No.: US 9,425,999 B1
(45) Date of Patent: Aug. 23, 2016

(54) PROCESS-VOLTAGE-TEMPERATURE (PVT) INVARIANT CONTINUOUS TIME EQUALIZER

(71) Applicant: Synaptics Incorporated, San Jose, CA (US)

(72) Inventor: Sagar Kumar, Bangalore (IN)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 14/871,995

(22) Filed: Sep. 30, 2015

(51) Int. Cl.
*H03H 7/40* (2006.01)
*H04L 25/03* (2006.01)

(52) U.S. Cl.
CPC ............................... *H04L 25/03878* (2013.01)

(58) Field of Classification Search
CPC ................................................ H04L 25/03878
See application file for complete search history.

(56) References Cited

U.S. PATENT DOCUMENTS

| | | |
|---|---|---|
| 5,283,483 A | 2/1994 | Laber et al. |
| 5,508,570 A | 4/1996 | Laber et al. |
| 5,559,470 A | 9/1996 | Laber et al. |
| 7,869,494 B2 | 1/2011 | Hollis |
| 8,643,432 B1 * | 2/2014 | Chan ....................... H03F 3/005 330/253 |
| 8,704,583 B2 * | 4/2014 | Bulzacchelli ......... H03F 1/0261 327/336 |
| 8,964,825 B2 * | 2/2015 | Beukema ............... G06G 7/184 375/232 |

OTHER PUBLICATIONS

Baprawski, John, "SerDes System CTLE Basics", Mar. 22, 2012, http://www.johnbaprawski.com (10 pages).

\* cited by examiner

*Primary Examiner* — Dac Ha
(74) *Attorney, Agent, or Firm* — Osha • Liang LLP

(57) ABSTRACT

A processing system for equalizing a data transfer. The processing system may include a trans-conductance generator that may obtain a first clock signal. The trans-conductance generator may generate a first bias signal using a first switched capacitor and the first clock signal. The first switched capacitor may charge according to the first clock signal. The processing system may further include a biasing circuit. The biasing circuit may obtain a second clock signal. The biasing circuit may generate a second bias signal using a second switched capacitor and the second clock signal. The second switched capacitor may charge according to the second clock signal. The processing system may further include a peaking amplifier. The peaking amplifier may generate an output signal using an input signal, the first bias signal, and the second bias signal.

20 Claims, 8 Drawing Sheets

PROCESS-VOLTAGE-TEMPERATURE (PVT) INVARIANT CONTINUOUS TIME EQUALIZER

BACKGROUND

In a high frequency data transfer systems, digital signal may be transmitted across a lossy channel. As such, the digital signal may experience increasing signal attenuation as the rate of data transfer increases. To reduce the signal attenuation, various integrated circuits may be employed within the high frequency data transfer system at the transmitter side or the receiver side of the lossy channel to amplify the signal as well as remove any resulting from the propagation of the digital signal over the lossy channel.

SUMMARY

In general, in one aspect, embodiments relate to an equalizer circuit. The equalizer circuit includes a trans-conductance generator that includes a transistor coupled to a first switched capacitor. The first switched capacitor is configured to charge according to a first clock signal. The trans-conductance generator is configured to generate a first bias signal using the first switched capacitor and the first clock signal. The equalizer circuit further includes an operational amplifier. The equalizer circuit further includes a second switched capacitor to the operational amplifier. The second switched capacitor is configured to charge according to a second clock signal. The operational amplifier is configured to generate a second bias signal using the second switched capacitor and the second clock signal. The equalizer circuit further includes a peaking amplifier coupled to the trans-conductance generator and the operational amplifier. The peaking amplifier is configured to generate an output signal based on an input signal, the first bias signal, and the second bias signal.

In general, in one aspect, embodiments relate to a processing system. The processing system includes a trans-conductance generator configured to obtain a first clock signal. The trans-conductance generator is further configured to generate a first bias signal using a first switched capacitor and the first clock signal. The first switched capacitor is configured to charge according to a first clock signal. The processing system further comprises a biasing circuit. The biasing circuit is configured to obtain a second clock signal. The biasing circuit is further configured to generate a second bias signal using a second switched capacitor and the second clock signal. The second switched capacitor is configured to charge according to the second clock signal. The processing system further comprises a peaking amplifier. The peaking amplifier is configured to generate an output signal using an input signal, the first bias signal, and the second bias signal.

In general, in one aspect, embodiments relate to a method for transferring data. The method includes obtaining a first plurality of data signals. The method further includes generating a serialized signal from the first plurality of data signals using a serializer device. The serialized signal includes data from the first plurality of data signals. The method further includes transmitting the serialized signal, through a transmission line, to an equalizer at a predetermined data rate. The predetermined data rate is within a predetermined frequency band of the equalizer. The predetermined frequency band is based on a predetermined clock frequency for charging a plurality of switched capacitors inside the equalizer. The method further includes generating an equalized signal from the serialized signal using the equalizer. The method further includes obtaining a second plurality of data signals from the equalized signal using a deserializer device.

Other aspects of the invention will be apparent from the following description and the appended claims.

DETAILED DESCRIPTION

Figure 1:
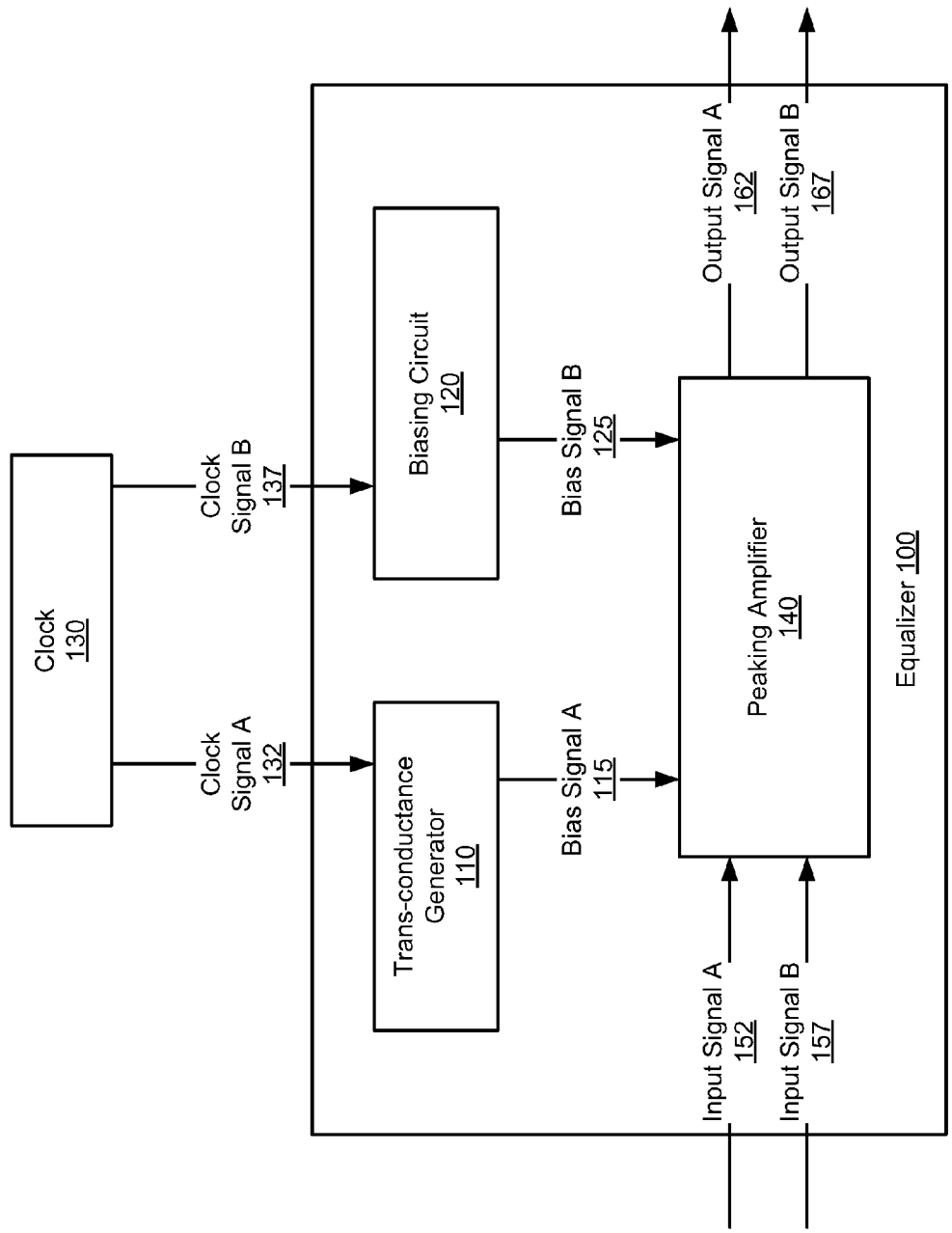
FIG. 1 shows a block diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention include an equalizer circuit, a processing system, and a method for transferring data. In particular, one or more embodiments are directed to an equalizer circuit that includes a trans-conductance generator, a biasing circuit, and a peaking amplifier. The trans-conductance generator and/or the biasing circuit may include one or more switched capacitors that charge according to one or more clock signals. Thus, the trans-conductance generator may produce a bias signal that determines a trans-conductance for a transistor within the peaking amplifier based on the capacitance of a switched capacitor and the clock frequency of the switched capacitor. On the other hand, the biasing circuit may produce another bias signal that determines an equivalent resistance within the peaking amplifier based on a capacitance of another switched capacitor and the clock frequency of the other switched capacitor. Thus, the equalizer circuit may produce a frequency response that includes pole locations and/or zero locations that are process, voltage, and temperature invariant.

FIG. 1 shows a block diagram of a system in accordance with one or more embodiments. In one or more embodiments, an equalizer (100) is coupled with a clock (130) as shown in FIG. 1. Specifically, the equalizer (100) may include a trans-conductance generator (110), a biasing circuit (120), and a peaking amplifier (140). The equalizer (100) may be configured to obtain one or more input signals (e.g., input signal A (152), input signal B (157)) to generate one or more output signals (e.g., output signal A (162), output signal B (167)). For example, the equalizer (100) may be configured to produce a differential signal using a pair of input signals (152, 157). Accordingly, the differential signal may be outputted as a pair of output signals (162, 167). Thus, the pair of input signals (152, 157) or pair of output signals (162, 167) may be complimentary signals where a subtractor circuit (not shown) determines a voltage difference between the complimentary signals. The equalizer (100) may also be configured within a single-ended signaling system where a single output signal is generated by the equalizer (100) using a single input signal.

The clock (130) may transmit various clock signals (e.g., clock signal A (132), clock signal B (137)) to the equalizer (100). In one or more embodiments, for example, the clock signals (132, 137) may be digital electrical signals operating at the same or different clock frequencies from each other. Thus, the clock signals (132, 137) may oscillate over a time period specified by the clock frequency for designating when various functionality is performed within the trans-conductance generator (110), the biasing circuit (120), and/or the peaking amplifier (140). In one or more embodiments, the clock signals (132, 137) charge one or more switched capacitors within the equalizer (100).

In one or more embodiments, the trans-conductance generator (110) produces a bias signal A (115) that controls a trans-conductance value of one or more transistors (not shown) within the peaking amplifier (140). Specifically, trans-conductance may describe the current variation between the input signals (152, 157) and current transmitted by the output signals (162, 167). With regard to circuit analysis, for example, trans-conductance may correspond to a ratio of an output current over an input voltage. Thus, the bias signal A (115) may bias the output signals (162, 167) produced by peaking amplifier (140), accordingly. In one or more embodiments, the bias signal A (115) is a voltage signal transmitted to the peaking amplifier (140) that determines or adjusts an equivalent resistance value within the peaking amplifier (140).

In one or more embodiments, a trans-conductance value generated by the bias signal A (115) is proportional to a capacitance of a switched capacitor (not shown) within the trans-conductance generator (110) and the clock frequency for operating the switched capacitor. Thus, in one or more embodiments, the trans-conductance value is determined by a circuit coupled to a transistor and where the circuit includes a switched capacitor opening and closing according to the clock frequency of the clock signal A (132). For an example of a switched capacitor circuit within the trans-conductance generator (110), see FIG. 2 and the accompanying description below.

Figure 2:
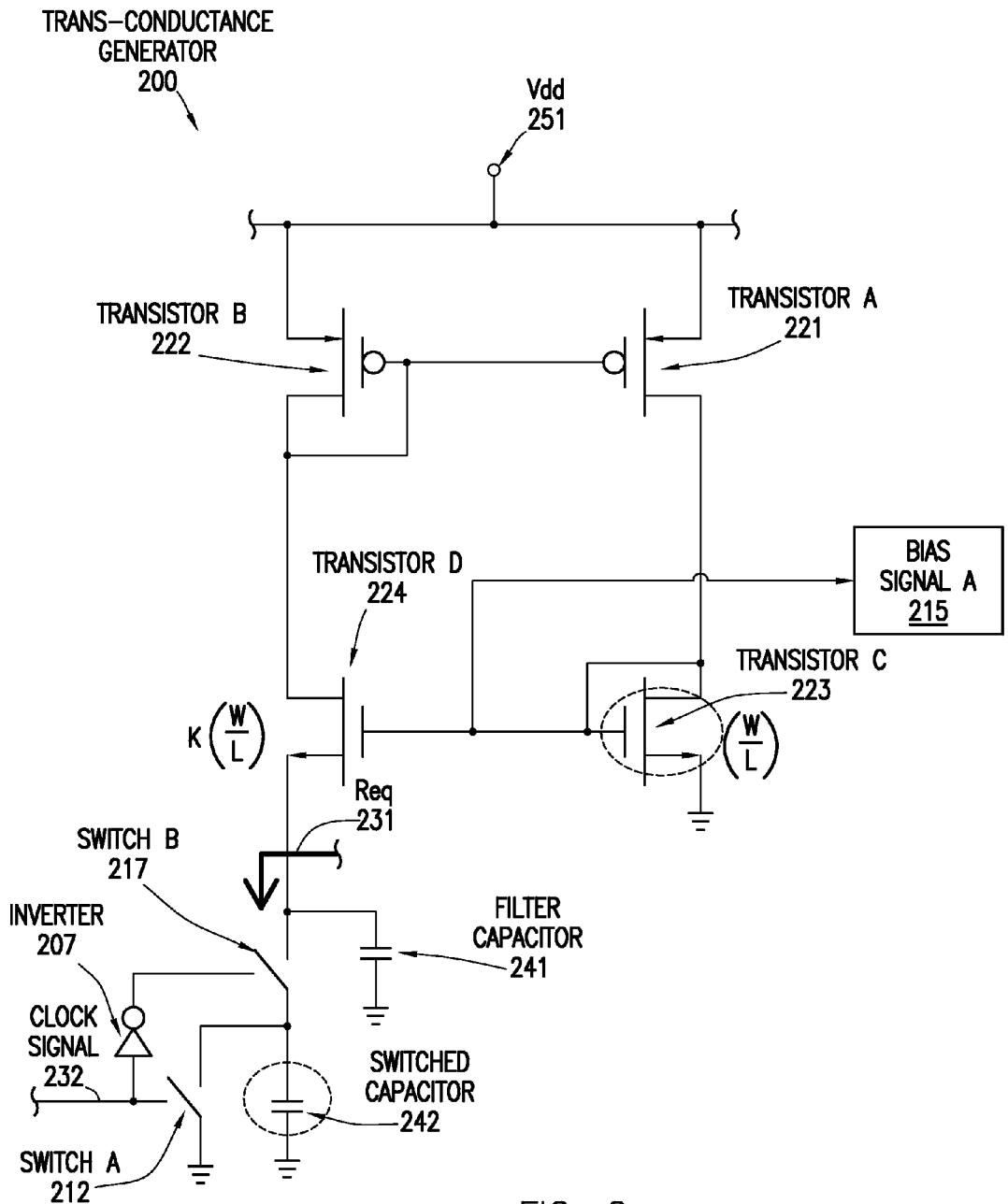
FIGS. 2-4 show schematic diagrams in accordance with one or more embodiments of the invention.

Turning to FIG. 2, FIG. 2 shows a schematic of a trans-conductance generator (200) in accordance with one or more embodiments. As shown in FIG. 2, the trans-conductance generator (200) includes various transistors (e.g., transistor A (221), transistor B (222), transistor C (223), and transistor D (224)) configured to generate a bias signal A (215). In one or more embodiments, a gate terminal of one of the transistors (221, 222, 223, 224) is coupled to a switched capacitor (242). Specifically, the switched capacitor (242) may be operated by a clock signal (232) coupled to a switch A (212) and a switch B (217). In one or more embodiments, when the clock signal (232) is at high voltage, switch A (212) is closed, which causes the switched capacitor (242) to enter a discharge state by grounding the switched capacitor (242). In the discharge state, the switched capacitor may dissipate charge until the clock signal (232) goes high again. In one or more embodiments, when the clock signal (232) is at a low voltage, switch A (212) is open and switch B (217) is closed, which causes the switched capacitor (242) to enter a charging state, e.g., using a reference current from the drain of transistor D (224). As shown, the high voltage and the low voltage may be implanted using an inverter (207).

Keeping with FIG. 2, the switched capacitor (242) may be coupled to a filter capacitor (241) as well as disposed between a ground and the source node of transistor D (224) as shown in FIG. 2. As such, the source terminal of transistor D (224) may have an equivalent resistance (Req) (231) corresponding to the combined resistance of the switched capacitor (242) and the filter capacitor (241). In one or more embodiments, filter capacitor (241) and the switched capacitor (242) are selected such that the capacitance of the switched capacitor (242) is less than the capacitance of the filter capacitor (241). Thus, voltage and/or current values at the source node of transistor D (224) may be held approximately constant using this circuit configuration. Instantaneous current may be provided by the filter capacitor (241), and average DC current may be drawn from transistor D (224) accordingly. If channel size (i.e., channel width W over channel length L) of transistor B (222) is equal to the size of transistor A (221), then the DC currents through transistor C (223) and transistor D (224) may be equal. In one or more embodiments, the DC currents are expressed by the following equation:

$$I_{ref} = \frac{C_1^2 f^2}{\frac{W}{2L} C_{ox} \mu_n} \left(1 - \frac{1}{\sqrt{K}}\right) \qquad \text{Equation 1}$$

which may be used to derive the trans-conductance $g_m$ of transistor C (223), which may be expressed by the following equation:

$$g_m = 2C_{1f}\left(1 - \frac{1}{\sqrt{K}}\right) \qquad \text{Equation 2}$$

where $I_{ref}$ is the DC current passing through transistor D (224) or transistor C (223), C1 is the capacitance of the switched capacitor (242), f is the clock frequency of the switched capacitor (242), W is the channel width of transistor C (223), L is the channel length of transistor C (223), K is proportional size constant between transistor C (223) and transistor D (224), $C_{ox}$ is the gate oxide capacitance of transistor C (223), and $\mu_n$ is the electron mobility of transistor c (223).

As shown by Equation 2, the trans-conductance $g_m$ may be approximately equal to the capacitance of the switched capacitor (242) and the clock frequency (i.e., $g_m \propto C_1 f$) operating the switched capacitor (242). In one or more embodiments, the trans-conductance $g_m$ is process-voltagetemperature invariant by being independent of any other parameters within the trans-conductance generator (200).

Returning to FIG. 1, in one or more embodiments, the biasing circuit (120) is a physical circuit that includes an amplifier (not shown), for example, an operational amplifier, coupled to a switched capacitor (not shown) to produce a bias signal B (125). In one or more embodiments, the bias signal B (125) provides an input voltage that controls one or more transistors (not shown) within the peaking amplifier (140), e.g., by controlling the gate voltage of the one or more transistors. In one or more embodiments, for example, the bias signal B (125) is an input voltage that determines an equivalent resistance of one or more p-type metal-oxide-semiconductor (PMOS) transistors within the peaking amplifier (140). Thus, in one or more embodiments, the equivalent resistance is inversely proportional to a capacitance of a switched capacitor and a clock frequency for operating the switched capacitor. Furthermore, the clock frequency may be determined by clock signal B (137) inputted to the biasing circuit (120).

Figure 3:
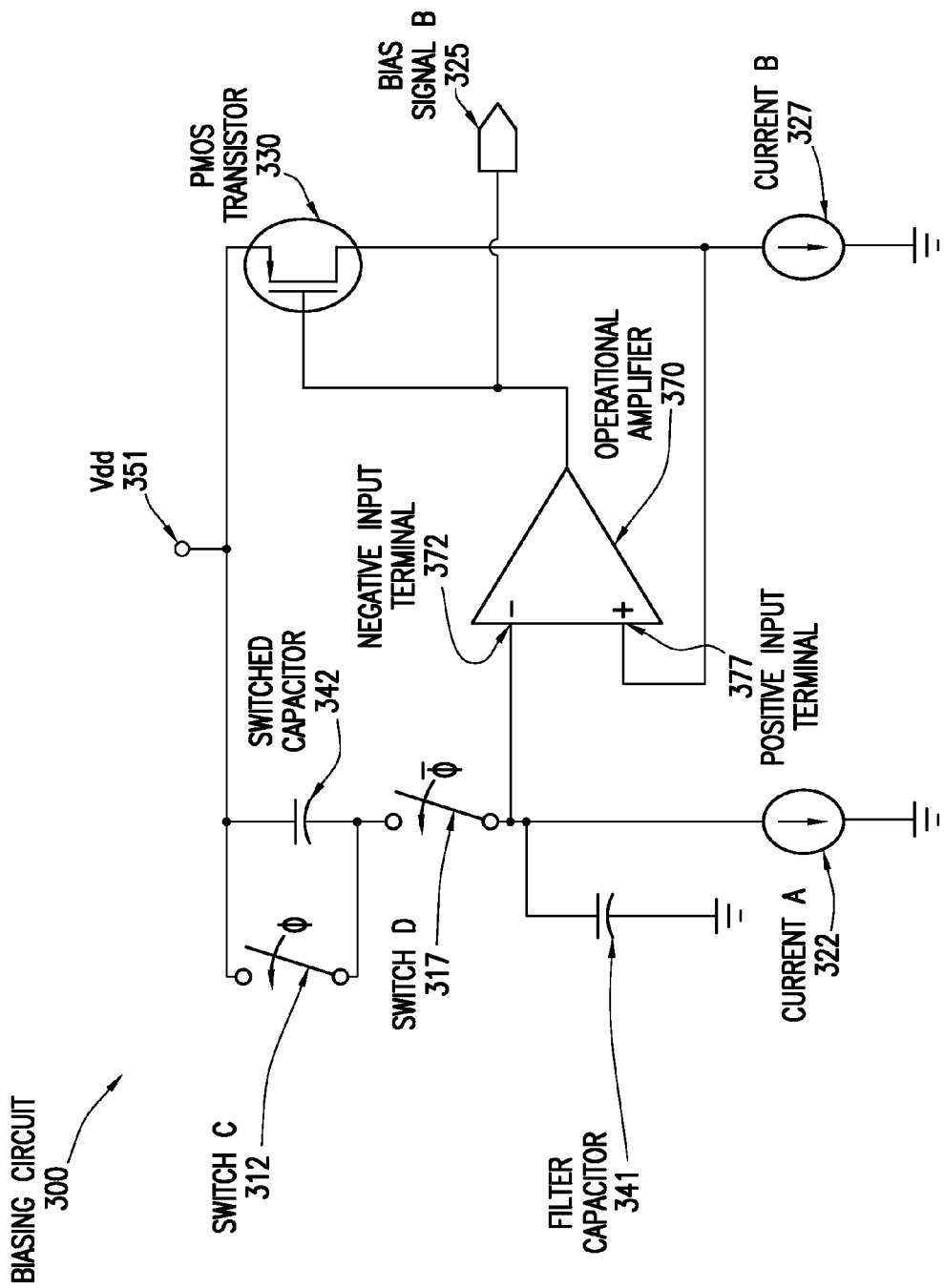

Turning to FIG. 3, FIG. 3 shows a schematic of a biasing circuit (300) in accordance with one or more embodiments. As shown in FIG. 3, in one or more embodiments, the biasing circuit (300) includes a p-type metal-oxide-semiconductor (PMOS) transistor (330) and an operational amplifier (370) having a negative input terminal (372) and a positive input terminal (377). In one or more embodiments, the operational amplifier (370) is configured to output a bias signal B (325) (also called a "Vgate signal"), which may be the bias signal B (125) as shown in FIG. 1. The biasing circuit (300) may further include a switched capacitor (342) and a filter capacitor (341). As shown, the biasing circuit (300) may also include a positive supply voltage (Vdd) (351) and may be modeled to include various current sources (i.e., current A (322) and current B (327)). In particular, current A (322) may be a reference current for the switched capacitor (342), while current B (327) is a reference current for the PMOS transistor (330). In one or more embodiments, current A (322) is approximately equal to current B (327).

In one or more embodiments, the switched capacitor (342) is coupled to various switches (i.e., switch C (312), switch D (317)). Similar to the switched capacitor (242) shown in FIG. 2, the switched capacitor (342) operates according to a clock frequency provided by a particular clock signal (e.g., clock signal B (137) in FIG. 1).

In one or more embodiments, the PMOS transistor (330) is biased such that a channel resistance (i.e., Req) of the PMOS transistor (330) is inversely proportional to the switched capacitor (342) and the clock frequency of the switched capacitor (342). In one or more embodiments, the voltage transmitted across the switched capacitor (342) corresponds to a drain source voltage of the PMOS transistor (330) by configuring the operational amplifier (370) in a negative feedback state. Using negative feedback, the operational amplifier (370) may generate the bias signal B (325). Furthermore, the switched capacitor (342) may have a capacitance value such that for particular reference current, under steady state conditions, an instantaneous voltage across the switched capacitor (342) occurs such that the PMOS transistor (330) operates in a transistor triode region.

In one or more embodiments, voltage across the switched capacitor (342) and the PMOS transistor (330) are equal, and carry equal currents as the reference current A (322) and current B (327) are equal. Therefore, in one or more embodiments, the equivalent resistance of switched capacitor (342) and PMOS transistor (330) are equal. As such, in one or more embodiments, the channel resistance across the PMOS transistor (330) is expressed by the following equation:

$$R_{eq} = \frac{1}{C_4 f} \quad \text{Equation 3}$$

where $R_{eq}$ is the channel resistance of the PMOS transistor (330), $C_4$ is the capacitance of the switched capacitor (342), and f is the clock frequency for operating the switched capacitor (342). As shown, the channel resistance of the PMOS transistor (330) may be equal to the equivalent resistance of the switched capacitor (342) and thus dependent on the capacitance of the switched capacitor (342) and the clock frequency f. Thus, in one or more embodiments, the channel resistance $R_{eq}$ and the bias signal B (325) are process-voltage-temperature invariant by being independent of any other parameters within the biasing circuit (300).

Returning to FIG. 1, in one or more embodiments, the peaking amplifier (140) is a physical circuit coupled to the trans-conductance generator (110) and the biasing circuit (120), and configured to generate the output signals (162, 167) with a peak magnitude in a particular frequency band. In one or more embodiments, the peak magnitude corresponds to an approximately maximum amplifier gain produced by the equalizer (100) for the output signals (162, 167) from the input signals (152, 157).

In one or more embodiments, the peaking amplifier (140) may produce a frequency response having a particular transfer function using the bias signals (115, 125). In other words, the frequency response may describe which input signals at which frequencies obtain a peak magnitude from the equalizer (100). For more information on frequency responses and transfer functions, see FIG. 5 and the accompanying description below.

Figure 4:
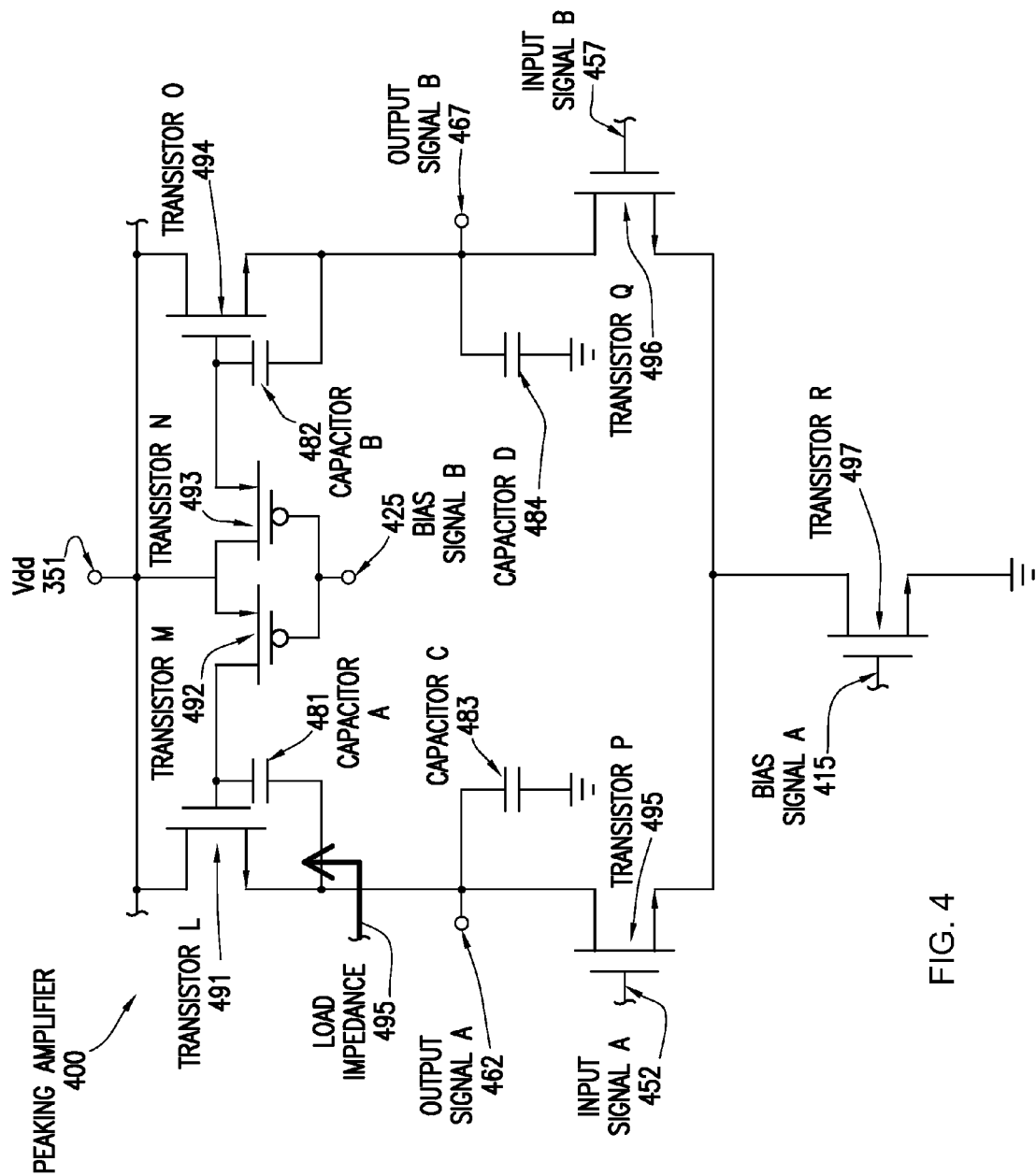

Turning to FIG. 4, FIG. 4 shows a schematic of a peaking amplifier (400) in accordance with one or more embodiments. As shown in FIG. 4, the peaking amplifier (400) may obtains various input signals (i.e., input signal A (452), input signal B (457)) and various bias signals (i.e., bias signal A (415), bias signal B (425)), and thereby generate various output signals (i.e., output signal A (462), output signal B (467)), accordingly. In particular, the peaking amplifier (400) may include various capacitors (e.g., capacitor A (481), capacitor B (482), capacitor C (483), and capacitor D (484)) as well as various transistors (e.g., transistor L (491), transistor M (492), transistor N (493), transistor O (494), transistor P (495), transistor Q (496), and transistor R (497)). In one or more embodiments, transistor R (497) is a n-type metal-oxide-semiconductor (NMOS) transistor. In one or more embodiments, one or more of the capacitors (481, 482, 483, 484) are non-switched capacitors, and thus charge independently of a clock signal. Components within the peaking amplifier (400) may be powered from a positive supply voltage (Vdd) (451).

Keeping with FIG. 4, in one or more embodiments, bias signal A (415) determines the trans-conductance for the transistor R (415). Furthermore, in one or more embodiments, the bias signal A (415) and the bias signal B (425) are generated using, for example, a circuit shown in FIG. 2 and/or FIG. 3. The bias signals (415, 425) may be used in the peaking stage (i.e., the frequency band having the peak magnitude) of the peaking amplifier (400). Additionally, transistor M (492) and transistor N (493) may be used as resistors for the peaking amplifier (400) to produce a load impedance (495). As the gate voltage of the transistors (492, 493) is determined by the bias signal B (425), in one or more embodiments, the equivalent resistance $R_{eq}$ of the transistors (492, 493) is inversely proportional to a switched capacitor and a clock frequency for the switched capacitor, e.g., the switched capacitor (342) from FIG. 3. Thus, in one or more embodiments, the transfer function of the peaking amplifier (400) is expressed in the following equation:

$$H(s) = \frac{g_{m9}}{g_{m12}} \left( \frac{1 + sR_{eq}C_5}{1 + \frac{sC_5}{g_{m12}}} \right) \qquad \text{Equation 4}$$

where H(s) is the transfer function, $R_{eq}$ is the equivalent resistance of-transistor M (492) or transistor N (493), C5 is the capacitance of capacitor A (481) or capacitor B (482), $g_{m9}$ is the trans-conductance of transistor P (495) or transistor Q (496), and $g_{m12}$ is the trans-conductance of transistor L (491) or transistor O (494). As shown in Equation 4, in one or more embodiments, for example, the transfer function includes a pole location and a zero location within the frequency response. In one or more embodiments, the pole location of the transfer function is expressed by the following equation:

$$\omega_P = \frac{g_{m14}}{C5} \qquad \text{Equation 5}$$

where $\omega_P$ is the frequency within the frequency response for the pole location, $g_{m14}$ is the trans-conductance of transistor M (492), and $C_5$ is the capacitance of capacitor A (481).

In one or more embodiments, the zero location of the transfer function H(s) is expressed by the following equation:

$$\omega_z = \frac{1}{R_{eq}C_5} \qquad \text{Equation 6}$$

where $\omega_z$ the frequency within the frequency response for the zero location, $R_{eq}$ is the channel resistance of a PMOS transistor from a biasing circuit, and $C_5$ is the capacitance of capacitor A (481).

In one or more embodiments, a switched capacitor for a trans-conductance generator and a switched capacitor for a biasing circuit are the same type of capacitor as capacitor A (481) and capacitor B (482) in the peaking amplifier (400). Specifically, the capacitance ratio between the capacitors (e.g., switched capacitor (242), switched capacitor (342), capacitor A (481), and capacitor B (482)) may remain approximately constant (e.g., constant with a predetermined tolerance). Thus, in one or more embodiments, the peaking amplifier (400) implements a transfer function that is independent of variations in the manufacturing process of the equalizer, temperature changes within the equalizer, and voltage variations obtained by various components within the equalizer.

Figure 5:
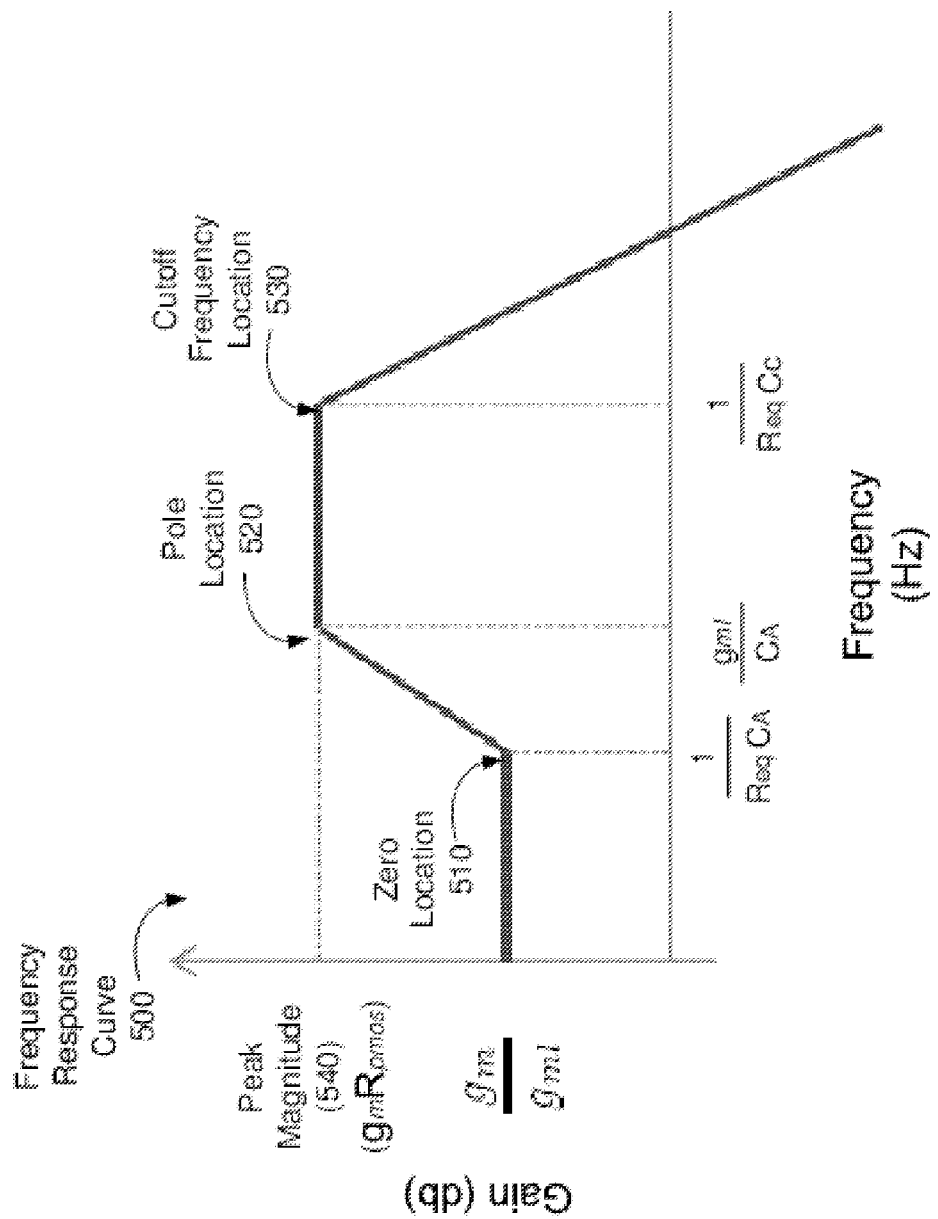
FIG. 5 shows a graph in accordance with one or more embodiments of the invention.

Turning to FIG. 5, FIG. 5 shows a frequency response for an equalizer in accordance with one or more embodiments. As shown in FIG. 5, a frequency response curve (500) may include a zero location (510), a pole location (520), and a cutoff frequency location (530). In particular, the frequency response curve (500) may describe a transfer function, for example H(s) in Equation 4 described above, for a range of data signal frequencies transmitted through an equalizer. Thus, as shown in FIG. 5, the equalizer with the frequency response curve (500) may generate an amplifier boost to a respective output signal operating for data frequencies between the pole location (520) and the cutoff frequency location (530). Specifically, input signals obtained at those data frequencies may acquire an amplifier gain that matches the peaking amplitude (540). In one or more embodiments, the zero location (510) and pole location (520) are determined by Equations 5 and 6 described above, respectively.

Figure 6:
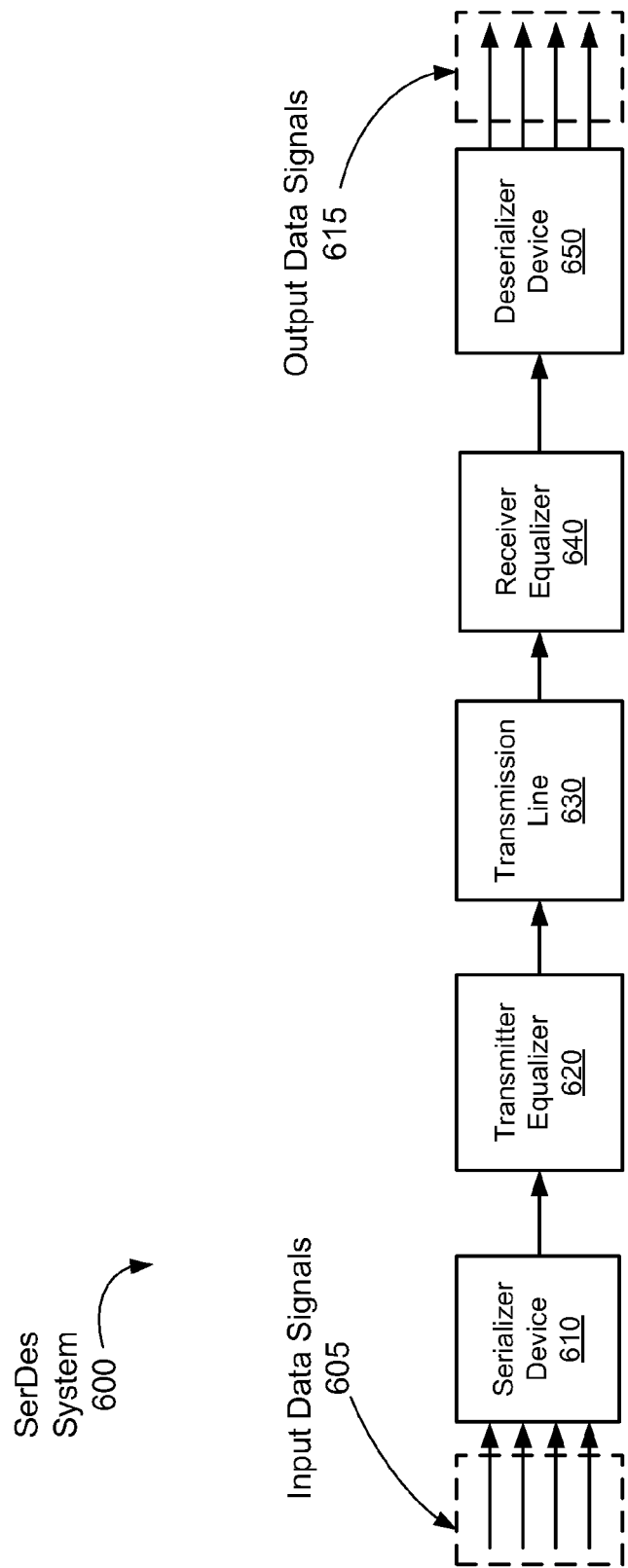
FIG. 6 shows a block diagram of a system in accordance with one or more embodiments of the invention.

Turning to FIG. 6, FIG. 6 shows a block diagram of a system in accordance with one or more embodiments. In one or more embodiments, FIG. 6 illustrates a serializer-deserializer (SerDes) system (600) that includes a serializer device (610), a transmitter equalizer (620), a transmission line (630), a receiver equalizer (640), and a deserializer device (650). Thus, the SerDes system (600) may obtain various input data signals (605) that the serializer device (610) transforms into a single serialized data signal for transmission to the transmitter equalizer (620). As such, the serialized data signal may describe data sequenced according to data obtained from the input data signals (605). For example, the serialized data signal may be a data signal with various interleaved bits at a data transfer rate higher than the data transfer speeds of the input data signals (605).

Furthermore, the transmitter equalizer (620) may be a continuous time linear equalizer that pre-conditions a serialized data signal for transmission over the transmission line (630). With respect to the transmission line (630) within the SerDes system (600), various types of data transmission lines may be used, such as physical wires or a signal trace on a printed circuit board. Thus, the transmission line (630) may operably connect the transmitter equalizer (620) with the receiver equalizer (640) to provide a channel for transmitting serialized data signals within the SerDes system (600).

Keeping with FIG. 6, the receiver equalizer (640) may obtain the serialized data signal from the transmission line (630). In one or more embodiments, the receiver equalizer (640) is the equalizer (100) described with respect to FIG. 1. As such, the output signals (162, 167) in FIG. 1 may provide a conditioned differential serialized signal that is transmitted to the deserializer device (650) in the SerDes system (600).

At the deserializer device (650), bits and/or symbols may be separated from a serialized data signal obtained from the receiver (640) and multiplexed into various output data signals (615).

Figure 7:
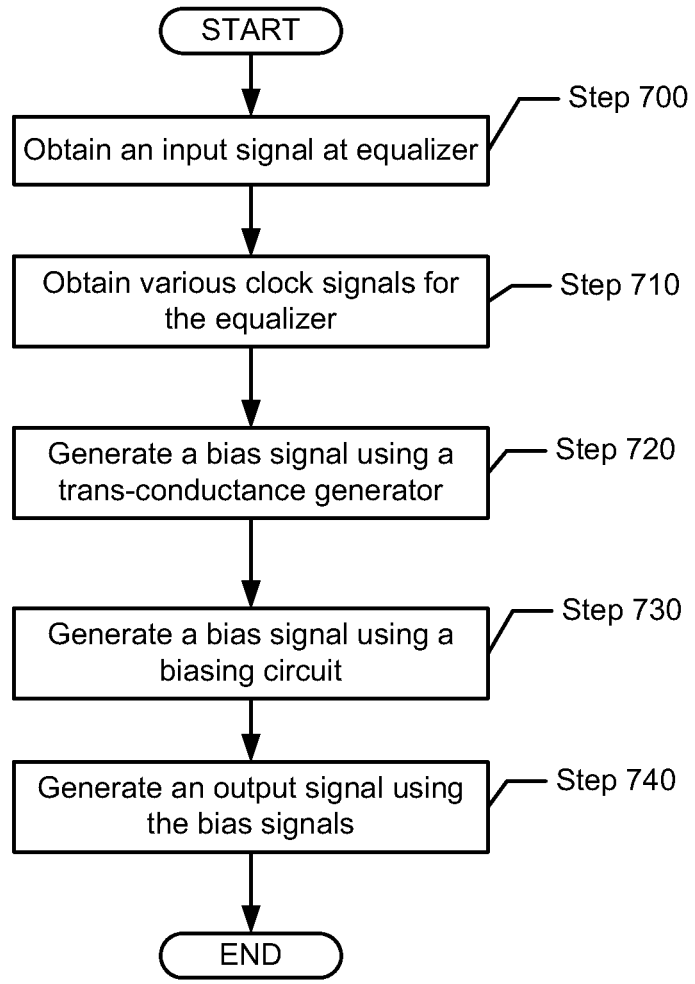
FIGS. 7-8 show flowcharts in accordance with one or more embodiments of the invention.

FIG. 7 shows a flowchart in accordance with one or more embodiments. Specifically, the process depicted in FIG. 7 may be performed by an equalizer as described in FIG. 1. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 700, an input signal is obtained at an equalizer in accordance with one or more embodiments. Specifically, the input signal may be a differential signal obtained from a transmission line coupled to the equalizer. For example, the input signal may include input signal A (152) and input signal B (157) as described in FIG. 1.

In Step 710, various clock signals are obtained for an equalizer in accordance with one or more embodiments. Specifically, one or more clocks may be coupled to an equalizer, and may generate the clock signals at various clock frequencies for operating components within an equalizer, such as a trans-conductance generator as described in FIG. 2 and/or a biasing circuit as described in FIG. 3.

In one or more embodiments, the clock signals may operate one or more switched capacitors inside the equalizer. In one or more embodiments, for example, the clock signals may determine the rate using their clock frequencies that switched capacitors charge inside the equalizer. Different clock signals may have different clock frequencies, and thus different switched capacitors may charge at different rates.

In one or more embodiments, for example, the clock signals determine one or more pole locations and/or one or more zero locations of a transfer function for the equalizer. In one or more embodiments, a clock is configured to adjust a frequency response of the equalizer by adjusting the various clock frequencies of the clock signals. Thus, the clock may move a zero location and/or a pole location of the frequency response by changing the clock frequencies. In one or more embodiments, the clock shifts a band of frequencies having a peak magnitude by changing the clock frequencies for one or more switched capacitors inside the equalizer. Specifically, in one or more embodiments, changing the clock frequency of a clock signal may adjust a channel resistance within a transistor to change an equivalent resistance within an equalizer (e.g., by changing a channel resistance or a trans-conductance of a transistor) in order to shift a zero location and/or a pole location of a transfer function. In one or more embodiments, a computing device is coupled to the clock, where the computing device is configured to adjust the clock frequency of the clock signals, and thus adjust the frequency response of the equalizer.

In Step 720, a bias signal is generated using a trans-conductance generator in accordance with one or more embodiments. In particular, the trans-conductance generator may be located inside the equalizer and configured to produce a bias signal to determine one or more characteristics of a transfer function for the equalizer. In one or more embodiments, for example, the bias signal determines a trans-conductance for one or more transistors inside the equalizer, e.g., inside a peaking amplifier with the equalizer as described in FIG. 4 above.

In Step 730, a bias signal is generated using a biasing circuit in accordance with one or more embodiments. In particular, the biasing circuit may be located inside the equalizer and configured to produce a bias signal for determining a gate voltage for one or more transistors inside the equalizer, e.g., inside a peaking amplifier within the equalizer.

In Step 740, an output signal is generated using various bias signals in accordance with one or more embodiments. Specifically, the output signal may be determined by the transfer function of an equalizer. For example, the bias signal in Step 710 and the bias signal in Step 740 may determine various pole locations and/or zero locations in the transfer function for the output signal. Thus, based on the frequency of the input signal in Step 700, a corresponding output signal may be generated according to the frequency response of the equalizer.

Figure 8:
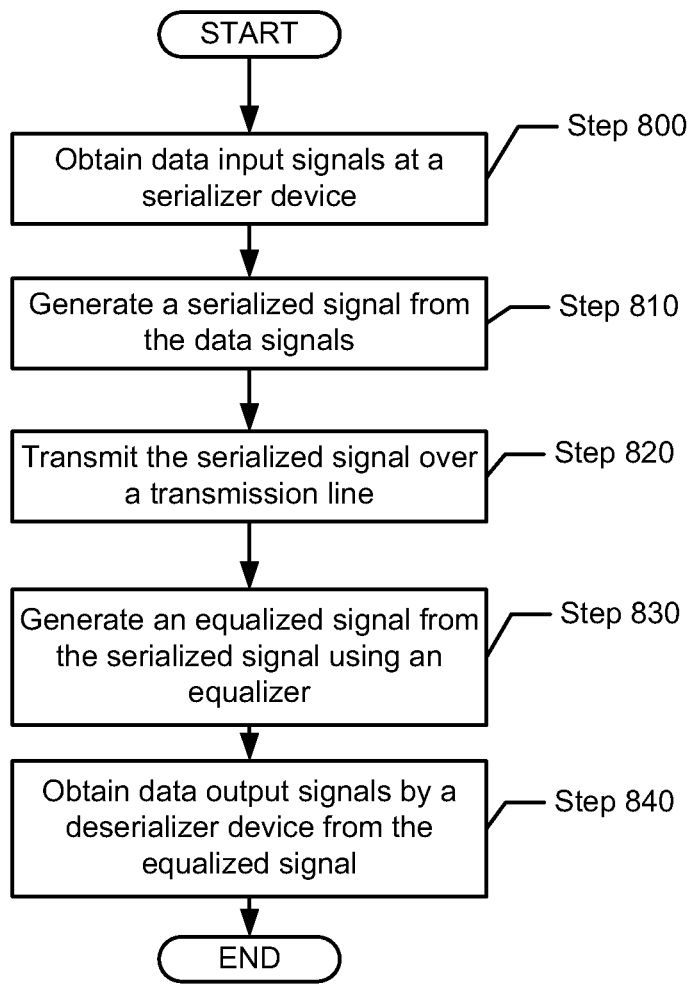

FIG. 8 shows a flowchart in accordance with one or more embodiments. Specifically, one or more steps in FIG. 8 may be performed by a SerDes system as described in FIG. 6. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 800, various data signals are obtained by a serializer device in accordance with one or more embodiments. In Step 810, a serialized signal is generated from various data signals in accordance with one or more embodiments.

In Step 820, a serialized signal is transmitted over a transmission line in accordance with one or more embodiments. In particular, a transmitter equalizer may obtain the serialized signal from Step 810 and condition the serialized signal to prevent interference between bits and/or symbols during transmission to a receiver equalizer. In other words, the transmitter equalizer may implement a pre-emphasis process with respect to the leading edge of bit and/or symbol transitions in the serialized data signal.

In one or more embodiments, the transmission line may include an input pin pair for transmitting a differential serialized data signal and an output pin pair for transmitting the differential serialized data signal to the receiver equalizer. In one or more embodiments, the input signals (152, 157) from FIG. 1 correspond to a differential serialized data signal from such an output pin pair.

In Step 830, an equalized signal is generated from the serialized signal using an equalizer in accordance with one or more embodiments. In particular, the receiver equalizer may output an equalized signal based on the transmission rate of the serialized signal obtained over the transmission line in Step 820. Thus, the receiver equalizer may remove interference at various unwanted frequencies (i.e., frequencies before or after the frequency band corresponding to a peak magnitude) within the serialized signal, while amplifying the serialized signal at various frequencies (i.e., frequencies within the frequency band corresponding to the peak magnitude) to recondition the serialized signal as an equalized signal for a deserializer device. In particular, the equalized signal may be a differential signal that corresponds to the output signals (162, 167) from FIG. 1.

In Step 840, various data signals are obtained by a deserializer device from the equalized signal in accordance with one or more embodiments. Thus, data embedded in the equalized signal from Step 830 may be separated out and transmitted as individual respective data signals for use by other electronics.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An equalizer circuit, comprising:
   a trans-conductance generator comprising a first transistor coupled to a first switched capacitor,
   wherein the first switched capacitor is configured to charge according to a first clock signal, and
   wherein the trans-conductance generator is configured to generate a first bias signal using the first switched capacitor and the first clock signal;
   an operational amplifier;
   a second switched capacitor coupled to the operational amplifier,
   wherein the second switched capacitor is configured to charge according to a second clock signal, and
   wherein the operational amplifier is configured to generate a second bias signal using the second switched capacitor and the second clock signal; and a peaking amplifier coupled to the trans-conductance generator and the operational amplifier,
wherein the peaking amplifier is configured to generate an output signal based on an input signal, the first bias signal, and the second bias signal.

2. The equalizer circuit of claim 1,
wherein the trans-conductance generator, the operational amplifier, and the peaking amplifier are configured to produce a transfer function comprising a zero location and a pole location, and
wherein the pole location of the transfer function is based on a predetermined clock frequency of the first clock signal and the second clock signal.

3. The equalizer circuit of claim 2,
wherein the transfer function comprises a peak magnitude based on the predetermined clock frequency.

4. The equalizer circuit of claim 1, further comprising:
a second transistor coupled to the operational amplifier,
wherein the second transistor comprises a channel resistance,
wherein the first clock signal and the second clock signal are configured with a predetermined clock frequency, and
wherein the channel resistance is inversely proportional to the predetermined clock frequency and a capacitance of the second switched capacitor.

5. The equalizer circuit of claim 1,
wherein the first transistor comprising a source terminal coupled with the first switched capacitor,
wherein the first switched capacitor comprises a first capacitance,
wherein the source terminal and the first switched capacitor are coupled to a filter capacitor comprising a second capacitance, and
wherein the first capacitance is less than the second capacitance.

6. The equalizer circuit of claim 1,
wherein the peaking amplifier comprises an NMOS transistor, and
wherein the first bias signal is a voltage applied to a gate terminal of the NMOS transistor.

7. The equalizer circuit of claim 1,
wherein the peaking amplifier comprises a PMOS transistor comprising a gate terminal, and
wherein the second bias signal is a voltage applied to the gate terminal of the PMOS transistor.

8. The equalizer circuit of claim 1,
wherein the peaking amplifier comprises a first non-switched capacitor and a second non-switched capacitor, and
wherein the first switched capacitor, the second switched capacitor, the first non-switched capacitor, and the second non-switched capacitor are the same type of capacitor.

9. The equalizer circuit of claim 1, further comprising:
a second transistor coupled to the operational amplifier,
wherein the second switched capacitor is coupled to a negative input terminal of the operational amplifier,
wherein the operational amplifier is a negative feedback amplifier comprising an output terminal,
wherein the output terminal is coupled to a gate terminal of the second transistor, and
wherein the output terminal is configured to transmit the second bias signal.

10. The equalizer circuit of claim 1, further comprising:
a first switch coupled to the first switched capacitor; and
a second switch coupled to the first switched capacitor,
wherein the first switch is configured to close when the first clock signal is at a high voltage and the second switch is configured to close when the first clock signal at a low voltage,
wherein the first switched capacitor is configured to charge when the first switch is closed, and
wherein the first switched capacitor is configured to dissipate charge when the second switch is closed.

11. A processing system for equalizing a data transfer, comprising:
a trans-conductance generator configured to:
obtain a first clock signal, and
generate a first bias signal using a first switched capacitor and the first clock signal, wherein the first switched capacitor charges according to the first clock signal;
a biasing circuit configured to:
obtain a second clock signal, and
generate a second bias signal using a second switched capacitor and the second clock signal, wherein the second switched capacitor is configured to charge according to the second clock signal; and
a peaking amplifier configured to generate an output signal using an input signal, the first bias signal, and the second bias signal.

12. The processing system of claim 11, further comprising:
a clock configured to adjust a predetermined clock frequency of the first clock signal and the second clock signal to shift a band of frequencies with a peak magnitude in the output signal.

13. The processing system of claim 11,
wherein the output signal corresponds to a transfer function,
wherein the transfer function comprising a zero location and a pole location, and
wherein the pole location of the transfer function is based on the predetermined clock frequency.

14. The processing system of claim 13,
wherein the transfer function comprises a peak magnitude based on the predetermined clock frequency.

15. The processing system of claim 11,
wherein the first switched capacitor is coupled to a first switch and a second switch,
wherein the first switch closes when the first clock signal is at a high voltage and the second switch closes when the first clock signal at a low voltage,
wherein the first switched capacitor charges when the first switch is closed, and
wherein the first switched capacitor dissipates charge when the second switch is closed.

16. The processing system of claim 11,
wherein the biasing circuit comprises an operational amplifier and a transistor,
wherein the second switched capacitor is coupled to a negative input terminal of the operational amplifier,
wherein the operational amplifier is a negative feedback amplifier comprising an output terminal,
wherein the output terminal is coupled to a gate terminal of the transistor, and
wherein the output terminal is configured to transmit the second bias signal.

17. The processing system of claim 11,
wherein the peaking amplifier is further configured to generate the output signal using a first non-switched capacitor and a second non-switched capacitor, and wherein the first switched capacitor, the second switched capacitor, the first non-switched capacitor, and the second non-switched capacitor are the same type of capacitor.

18. A method for transferring data, comprising:
obtaining a first plurality of data signals;
generating a serialized signal from the first plurality of data signals using a serializer device, wherein the serialized signal comprises data from the first plurality of data signals;
transmitting the serialized signal, through a transmission line, to an equalizer at a predetermined data rate,
  wherein the predetermined data rate is within a predetermined frequency band of the equalizer, and
  wherein the predetermined frequency band is based on a predetermined clock frequency for charging a plurality of switched capacitors inside the equalizer;
generating an equalized signal from the serialized signal using the equalizer; and
obtaining a second plurality of data signals from the equalized signal using a deserializer device.

19. The method of claim 18, further comprising:
generating a transfer function for the equalizer using a first clock signal and a second clock signal corresponding to the predetermined clock frequency,
wherein the transfer function comprises a zero location and a pole location,
wherein the predetermined frequency band is located between the zero location in the transfer function and the pole location in the transfer function, and
wherein the pole location is based on a capacitance of a switching capacitor of the plurality of switched capacitors and the predetermined clock frequency.

20. The method of claim 18, further comprising:
adjusting the predetermined clock frequency to shift a band of frequencies with a peak magnitude in the equalized signal.

* * * * *